United States Patent
Song et al.

(10) Patent No.: US 7,599,013 B2
(45) Date of Patent: Oct. 6, 2009

(54) DISPLAY DEVICE AND MANUFACTURING METHOD THEREFOR

(75) Inventors: Keun-kyu Song, Gyeonggi-do (KR);
Mun-pyo Hong, Gyeonggi-do (KR);
Young-min Kim, Gyeonggi-do (KR)

(73) Assignee: Samsung Electronics Co., Ltd., Gyeonggi-Do (KR)

( * ) Notice: Subject to any disclaimer, the term of this patent is extended or adjusted under 35 U.S.C. 154(b) by 392 days.

(21) Appl. No.: 11/724,889

(22) Filed: Mar. 15, 2007

(65) Prior Publication Data

US 2007/0216823 A1 Sep. 20, 2007

(30) Foreign Application Priority Data

Mar. 15, 2006 (KR) ...................... 10-2006-0023771

(51) Int. Cl.
*G02F 1/1343* (2006.01)
(52) U.S. Cl. .............................. 349/39; 349/38; 349/43
(58) Field of Classification Search .................... 349/39
See application file for complete search history.

(56) References Cited

U.S. PATENT DOCUMENTS

2005/0253991 A1* 11/2005 Chang ........................ 349/147

FOREIGN PATENT DOCUMENTS

| JP | 2000305111 | 11/2000 |
|----|------------|---------|
| JP | 2001-013520 | 1/2001 |
| KR | 1020050070770 | 7/2005 |

OTHER PUBLICATIONS

English Language Abstract, KR Patent First Publication No. 1020050070770, Jul. 7, 2005, 1 page.
English Language Abstract, JP Patent First Publication No. 2001-013520, Jan. 19, 2001, 1 page.
English Language Abstract, JP Patent First Publication No. 2000305111, Nov. 2, 2000, 1 page.

* cited by examiner

*Primary Examiner*—Richard H Kim
(74) *Attorney, Agent, or Firm*—Haynes and Boone, LLP (57) ABSTRACT

A display device capable of minimizing leakage of a voltage applied to a storage line, comprising an insulating substrate; a first metal wiring layer which is formed on the insulating substrate; a storage line which is isolated from the first metal wiring layer and formed along the first metal wiring layer; a first insulating film which covers the first metal wiring layer and the storage line; a second metal wiring layer which is formed on the first insulating film and comprises a storage capacity forming layer corresponding to the storage line; a second insulating film which covers the second metal wiring layer and comprises a pixel contact hole exposing a portion of the storage capacity forming layer; and a pixel electrode which is formed on the second insulating film and connected to the storage capacity forming layer via the pixel contact hole.

21 Claims, 11 Drawing Sheets

DISPLAY DEVICE AND MANUFACTURING METHOD THEREFOR

CROSS-REFERENCE TO RELATED APPLICATIONS

This application claims the benefit of Korean Patent Application No. 2006-0023771, filed on Mar. 15, 2006, in the Korean Intellectual Property Office, the disclosure of which is incorporated herein by reference in its entirety.

BACKGROUND OF THE INVENTION

1. Field of the Invention

The present invention relates to a display device and, more particularly, to a display device that minimizes voltage leakage from storage lines, and a manufacturing method therefor.

2. Description of the Related Art

Flat panel display devices, such as the liquid crystal display (LCD) and the organic light emitting diode (OLED) display, have become important because they are lightweight and can be miniaturized. For example, a LCD includes an LCD panel composed of a thin film transistor (TFT) substrate on which TFTs are formed, a color filter substrate on which color filters are formed, and a liquid crystal layer located between both substrates.

Data voltages are applied to the pixels through the TFTs. The time during which a data voltage is applied to the pixels is very short, but the interval between an application time and the next application time is very long. Therefore, during the period when no data voltage is applied, i.e., while the TFTs are turned off, the storage capacitances of the pixels maintain their respective voltage.

In general, a storage capacitance is formed by a storage line provided in parallel to a gate line, a gate insulating film and a passivation layer which are provided on the storage line, and a pixel electrode formed on the passivation layer.

However, the passivation layer comprises an organic material, which causes leakage of the data voltage applied to the storage line which may result in degraded image quality.

SUMMARY OF THE INVENTION

Accordingly, it is an aspect of the present invention to provide a display device, which is capable of minimizing leakage of a voltage applied to a storage line, and a manufacturing method thereof.

The foregoing and/or other aspects of the present invention are achieved by a display device comprising an insulating substrate; a first metal wiring layer formed on the insulating substrate; a storage line isolated from and formed along the first metal wiring layer; a first insulating film covering the first metal wiring layer and the storage line; a second metal wiring layer formed on the first insulating film and having a storage capacity forming layer corresponding to the storage line; a second insulating film covering the second metal wiring layer and having a pixel contact hole exposing a portion of the storage capacity forming layer; and a pixel electrode formed on the second insulating film and connected to the storage capacity forming layer via the pixel contact hole.

According to another aspect of the present invention, the first metal wiring layer and the storage line are formed on the same layer and with same material.

According to another aspect of the present invention, the storage capacity forming layer has the substantially same shape as the storage line, and the storage line, the first insulating film and the storage capacity forming layer form a storage capacity.

According to another aspect of the present invention, the first metal wiring layer comprises a data wiring line having a data line and a data pad located at an end of the data line, and the second metal wiring layer comprises a gate wiring line including a gate line intersecting the data line, a gate electrode branched from the gate line, a gate pad provided at an end of the gate line, and a connecting member located between the data line and the gate electrode and connected to the data line via a first insulating contact hole formed on the first insulating film.

According to another aspect of the present invention, the first insulating film comprises an inorganic material and the second comprises an organic material, a connecting member contact hole exposing a portion of the connecting member, a gate pad contact hole exposing a portion of the gate pad, and a data pad contact hole exposing a portion of the data pad are formed in the second insulating film.

According to another aspect of the present invention, a source electrode connected to the connecting member via the connecting member contact hole and partially overlapping with the gate electrode, and a drain electrode isolated from the source electrode and connected to the pixel electrode, with the gate electrode interposed between the drain electrode and the source electrode, a channel region being defined by the drain electrode and the source electrode, are further provided on the second insulating film, and each of the source electrode, the drain electrode and the pixel electrode contains one of ITO (Indium Tin Oxide) and IZO (Indium Zinc Oxide).

According to another aspect of the present invention, an organic semiconductor layer is formed in the channel region.

According to another aspect of the present invention, the first metal wiring layer comprises a data wiring line including a data line, a data pad located at an end of the data line, and a light shielding film located at one side of the data line, the second metal wiring layer further comprises a source electrode and a drain electrode separated from each other on the first insulating film by the light shielding film interposed between the source electrode and the drain electrode, and defining a channel region.

According to another aspect of the present invention, the source electrode, the drain electrode and the storage capacity forming layer are formed on the same layer and with the same material.

According to another aspect of the present invention, an opening exposing the channel region and a drain contact hole exposing a portion of the drain electrode are formed in the second insulating film, and the pixel electrode is connected to the drain electrode via the drain contact hole.

According to another aspect of the present invention, a first insulating contact hole exposing a portion of the data line is formed in the first insulating film, and the source electrode is connected to the data line via the first insulating contact hole.

According to another aspect of the present invention, the display device further comprises an organic semiconductor layer which is formed in the opening; an organic insulating film which covers the organic semiconductor layer; and a gate wiring line which includes a gate electrode formed on the organic insulating film on the organic semiconductor layer.

The foregoing and/or other aspects of the present invention are also achieved by providing a manufacturing method of a display device, comprising forming a first metal wiring layer on an insulating substrate; forming a storage line isolated from the first metal wiring layer and extending along the first metal wiring layer; forming a first insulating film to cover the first metal wiring layer and the storage line; forming a second metal wiring layer on the first insulating film, the second metal wiring layer having a storage capacity forming layer corresponding to the storage line; forming a second insulating film on the second metal wiring layer, the second insulating film having a pixel contact hole exposing a portion of the storage capacity forming layer; and forming a pixel electrode on the second insulating film, the pixel electrode contacting with the storage capacity forming layer via the pixel contact hole.

According to another aspect of the present invention, the first metal wiring layer and the storage line are simultaneously formed.

According to another aspect of the present invention, the storage capacity forming layer has the substantially same shape as the storage line, and the storage line, the first insulating film and the storage capacity forming layer form storage capacity.

According to another aspect of the present invention, the first metal wiring layer comprises a data wiring line having a data line and a data pad located at an end of the data line, and the second metal wiring layer comprises a gate wiring line including a gate line intersecting the data line, a gate electrode branched from the gate line, a gate pad provided at an end of the gate line, and a connecting member located between the data line and the gate electrode and connected to the data line via a first insulating contact hole formed on the first insulating film.

According to another aspect of the present invention, the second insulating film further comprises a connecting member contact hole exposing a portion of the connecting member, a gate pad contact hole exposing a portion of the gate pad and a data pad contact hole exposing a portion of the data pad, and the pixel contact hole, the connecting member contact hole, the gate pad contact hole and the data pad contact hole are simultaneously formed.

According to another aspect of the present invention, a source electrode connected to the connecting member via the connecting member contact hole and partially overlapping with the gate electrode, and a drain electrode isolated from the source electrode by the gate electrode interposed between the drain electrode and the source electrode and defining a channel region, are further provided on the second insulating film, the pixel electrode is connected to the drain electrode, and the source electrode, the drain electrode and the pixel electrode are simultaneously formed.

According to another aspect of the present invention, each of the source electrode, the drain electrode and the pixel electrode comprises one of ITO (Indium Tin Oxide) and IZO (Indium Zinc Oxide).

According to another aspect of the present invention, the manufacturing method further comprises forming an organic semiconductor layer in the channel region.

According to another aspect of the present invention, the first metal wiring layer comprises a data line, a data pad located at an end of the data line, and a light shielding film located at one side of the data line, the second metal wiring layer further comprises a source electrode and a drain electrode isolated from each other by the light shielding film interposed between the source electrode and the drain electrode and defining a channel region, and the source electrode, the drain electrode and the storage capacity forming layer are simultaneously formed.

According to another aspect of the present invention, the manufacturing method further comprises forming an organic semiconductor layer in the channel region; forming an organic insulating film on the organic semiconductor layer; and forming a gate wiring line including a gate electrode located on the organic insulating film.

According to another aspect of the present invention, an opening exposing the channel region, a drain contact hole exposing a portion of the drain electrode, a gate pad contact hole exposing a portion of the gate pad and a data pad contact hole exposing a portion of the data pad are formed in the second insulating film, the pixel electrode is connected to the drain electrode via the drain contact hole, and the pixel contact hole, the opening, the drain contact hole, the gate pad contact hole and the data pad contact hole are simultaneously formed.

According to another aspect of the present invention, a first insulating contact hole exposing a portion of the data line is formed in the first insulating film, and the source electrode is connected to the data line via the first insulating contact hole.

BRIEF DESCRIPTION OF THE DRAWINGS

The above and/or other aspects and advantages of the present invention will become apparent and more readily appreciated from the following description of the embodiments, taken in conjunction with the accompanying drawings in which:

FIGS. 3a to 6b are sectional views used to sequentially explain a manufacturing method of the display device according to the first embodiment of the present invention.

DETAILED DESCRIPTION OF THE PREFERRED EMBODIMENT

In the following description, the phrase 'a film (layer) is formed "on" another film (layer)' means to include a case where a film (layer) exists between two different films (layers), as well as a case where two films (layers) make direct contact with each other.

In a first embodiment of the present invention, an organic semiconductor layer is employed for a TFT substrate. It is to be understood that the present invention is applicable to any display device, such as an LCD, an OLED and so on, including the TFT substrate.

Figure 1:
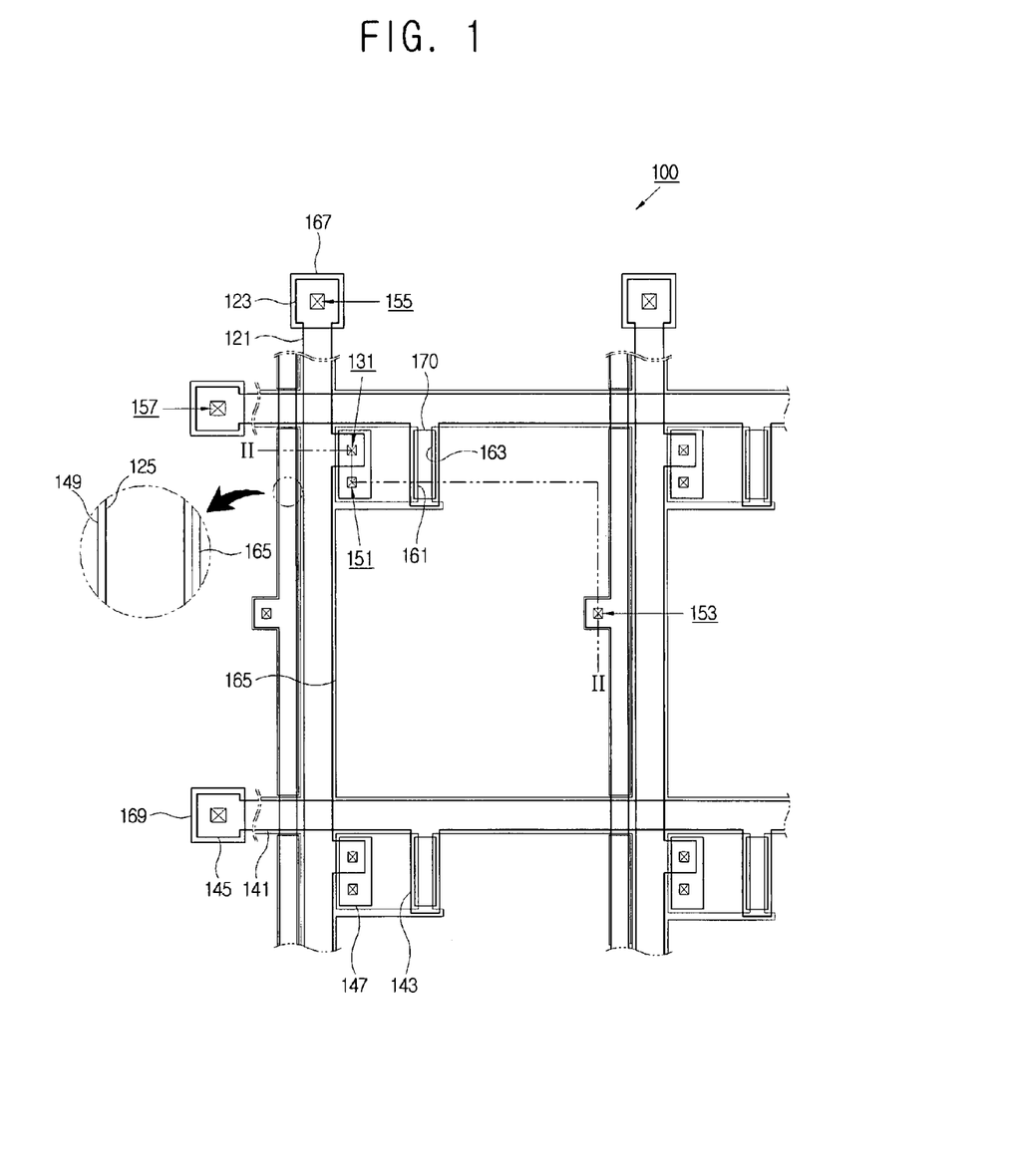
FIG. 1 illustrates a TFT substrate of a display device according to a first embodiment of the present invention.
Figure 2:
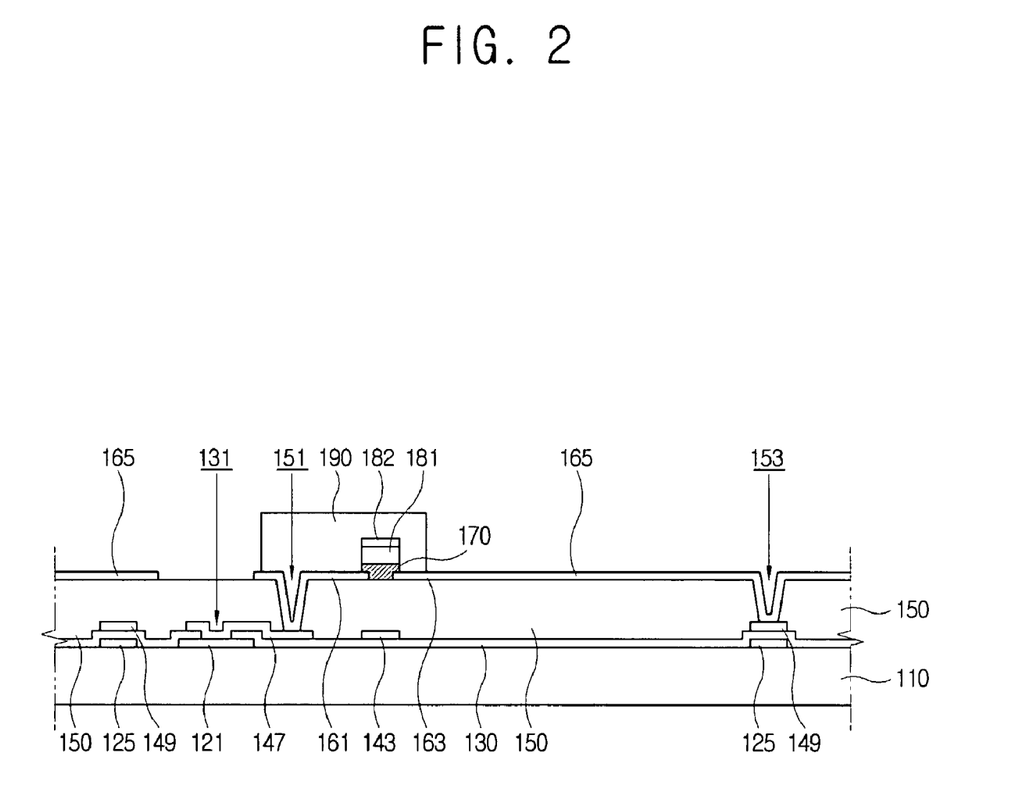
FIG. 2 is a sectional view of the TFT substrate of the display device according to the first embodiment of the present invention, taken along line II-II in FIG. 1.

FIG. 1 illustrates a TFT substrate of a display device according to a first embodiment of the present invention. FIG. 2 is a sectional view of the TFT substrate of the display device according to the first embodiment of the present invention, taken along line II-II of FIG. 1.

Referring to FIGS. 1 and 2, a TFT substrate 100 comprises an insulating substrate 110, first wiring layers 121, 123 and 125 formed on the insulating 110, a first insulating film 130 formed on the first wiring layers 121 and 123, second wiring layers 141, 143, 145, 147 and 149 formed on the first insulating film 130, a second insulating film 150 formed on the second wiring layers 141, 143, 145, 147 and 149 in order, transparent electrode layers 161, 163, 165, 167 and 169 formed on the second insulating film 150, an organic semiconductor layer 170 which contacts at least a portion of the transparent electrode layers 161, 163, 165, 167 and 169 and formed on the second insulating film 150, and first and second passivation layers 181 and 182 formed on the organic semiconductor layer 170 in order.

The insulating substrate 110 may comprise glass or plastic, the latter having the benefit of adding flexibility to the TFT substrate 100 and can accommodate an organic semiconductor layer 170 that can be formed at normal temperature and pressure.

The first wiring layers 121, 123 and 125 are formed on the insulating substrate 110. The first wiring layers 121, 123 and 125 comprise a data line 121 extending over the insulating substrate 110 in one direction, a data pad 123 provided at an end of the data line 121 for receiving an outside driving or control signal, and a storage line 125 isolated from the data line 121 and data pad 123 and formed along the data line 121. The first wiring layers 121, 123 and 125 may comprise at least one of Al, Cr, Mo, Nd, Au, Pt and Pd. The first wiring layers 121, 123 and 125 may be provided as a single layer or multiple layers.

The storage line 125 and the first wiring layers 121 and 123 are formed at the same time. The storage line 125 forms a storage capacity along with the first insulating film 130 and the storage capacity forming layer 149 (to be described later). The storage capacity maintains a voltage applied to pixels during a specified period of time even when the TFTs are turned off, thereby forming an image.

The first insulating film 130 covers the first wiring layers 121,123 and 125. The first insulating film 130 serves to electrically isolate the first wiring layers 121, 123 and 125 from the second wiring layers 141, 143, 145, 147 and 149. The first insulating film 130 may comprise an inorganic film made of inorganic material such as silicon nitride (SiNx), silicon oxide (SiOx) or the like having excellent workability. The first insulating film 130 comprises a first insulating contact hole 131 exposing the data line 121. The first insulating film 130 may comprise a double film including an inorganic film and an organic film.

The organic semiconductor layer 170 may be damaged by remaining chemical material or plasma that is used to form the first wiring layers 121,123 and 125. The first insulating film 130 minimizes damage to the organic semiconductor layer 170 which has weak resistance to chemicals and plasma.

The second wiring layers 141, 143, 145, 147 and 149 are formed on the first insulating film 135. The second wiring layers 141, 143, 145, 147 and 149 comprise gate wiring lines composed of a gate line 141 intersecting but insulated from the data line 121, with pixels defined by the gate line 141 and the data line 121. A gate pad 145 is provided at an end of the gate line 141 and supplied with an external driving or control signal. A gate electrode 143, which is a branch of the gate line 141 is formed corresponding to the organic semiconductor layer 170, which will be described later. A connecting member 147 is connected to the data line 121 via the first insulating contact hole 131, and a storage capacity forming layer 149 is formed on the first insulating film 130. The gate pad 145 receives the external driving or control signal to turn on/off the TFTs and transmits it to the gate electrode 143 via the gate line 141. The connecting member 147 connects the data line 121 to a source electrode 161. The second wiring layers 141, 143, 145, 147 and 149 may also comprise at least one of Al, Cr, Mo, Nd, Au, Pt and Pd. The second wiring layers 141, 143, 145,147 and 149 may be provided as a single layer or multiple layers, like the first wiring layers 121 and 123. The storage capacity forming layer 149 provides storage capacity along with the storage line 125 and the first insulating film 130 as mentioned above. In FIG. 1, the storage capacity forming layer 149 is shown having an area larger than the storage line 125 for convenience and clarity of description. It is to be understood that the storage capacity forming layer 149 is provided to have a size corresponding to the storage line 125, or a size somewhat larger or smaller than the storage line 125, if necessary.

In conventional display devices, the TFT substrate 100 has no storage capacity forming layer 149, the storage capacity is formed by the storage line 125, the first insulating film 130, the second insulating film 150 and the pixel electrode 165. However, since the second insulating film 150 is a thick organic film comprising an organic material, it may cause leakage of the voltage applied to the storage line 125. The storage capacity cannot be well formed due to such voltage leakage by the second insulating film 150, thereby driving the liquid crystal layer abnormally, which results in the degradation of image quality.

To overcome this problem, the improved structure of the present invention provides a storage capacity forming layer 149 formed on the first insulating film 130 on the storage line 125 with the second insulating film 150 removed, to form the storage capacity, as described above. With such a structure, since the second insulating film 150 causing the voltage leakage does not form the storage capacity, leakage of a voltage applied to the storage line 125 can be minimized. When the thick second insulating film 150 is removed, the storage capacity, which is expressed by $\in(s/d)$ (where, $\in$ is a dielectric constant, s is a cross section of an electrode, and d is the distance between two electrode), becomes large as the distance d between both electrodes (i.e., the storage line 125 and the storage capacity forming layer 149) become small. Accordingly, the storage capacity is well formed, thereby minimizing deterioration of image quality.

The second insulating film 150 is formed on the second wiring layers 141, 143, 145, 147 and 149. The second insulating film 150, which is an organic film comprising an organic material, protects the first wiring layers 121 and 123, the storage line 125 and the second wiring layers 141, 143, 145, 147 and 149 and prevents contaminants from being introduced into the organic semiconductor layer 170 which exhibits poor chemical resistance and plasma resistance. In the second insulating film 150 are formed a connecting member contact hole 151 exposing a portion of the connecting member 147, a pixel contact hole 153 exposing a portion of the storage capacity forming layer 149, a data pad contact hole 155 exposing a portion of the data pad 123 and a gate pad contact hole 157 exposing a portion of the gate pad 145. In this case, the pixel contact hole 153 is a path to connect the storage capacity forming layer 149 to the pixel electrode 165. The formed storage capacity applies a constant voltage to the liquid crystal layer via the pixel electrode 165.

The transparent electrode layers 161, 163, 165, 167 and 169 are formed on the second insulating film 150. The transparent electrode layers 161,163,165,167 and 169 comprise a source electrode 161 connected to the data line 121 via the connecting member contact hole 151 and at least partially contacting with the organic semiconductor layer 170, a drain electrode 163 separated from the source electrode 161 by the organic semiconductor layer 170 interposed there between, a pixel electrode 165 connected to the drain electrode 163 and formed on a pixel region and a data pad contacting member 167 and a gate pad contacting member 169 covering the data pad contacting hole 155 and the gate pad contacting hole 157, respectively. The transparent electrode layers 161, 163, 165, 167 and 169 comprise a transparent conductive material such as ITO or IZO. The source electrode 161 is physically and electrically connected to the data line 121 via the connecting member contact hole 151 to receive an image signal. The drain electrode 163 separated from the source electrode 161 by the gate electrode 143 interposed there between, forms a TFT along with the source electrode 161 and serves as a switching and driving element to control and drive an operation of the pixel electrode 165. The pixel electrode 165 is connected to the storage capacity forming layer 149 via the pixel contact hole 153. The storage capacity formed by the storage capacity forming layer 149, the first insulating film 130 and the storage line 125 applies a constant voltage to the liquid crystal layer via the pixel electrode 165.

The organic semiconductor layer 170 is formed in a channel region. The organic semiconductor layer 170 covers the channel region and at least partially contacts with the source electrode 161 and the drain electrode 163. Such an organic semiconductor layer 170 may comprise an organic semiconductor material, such as pentacene or the like, well known in the art.

The first passivation layer 181 is formed on the organic semiconductor layer 170. The first passivation layer 181 covers the organic semiconductor layer 170 and may be a thick organic film comprising fluorine polymer. The first passivation layer 181 prevents the organic semiconductor layer 170 from being deteriorated. The second passivation layer 182 may be further formed on the first passivation layer 181. The second passivation layer 182 is also used as a mask for patterning the organic semiconductor layer 170 and the first passivation layer 181 and improves a characteristic of an organic TFT by protecting the organic semiconductor layer 170. The second passivation layer 182 may comprise either ITO or IZO.

In addition, a low temperature organic film 190 covering the connecting member contact hole 151 and the organic semiconductor layer 170 may be included.

Hereinafter, a manufacturing method of the display device comprising the organic TFT according to the first embodiment of the present invention will be described with reference to FIGS. 3a to 6b.

Figure 3A:
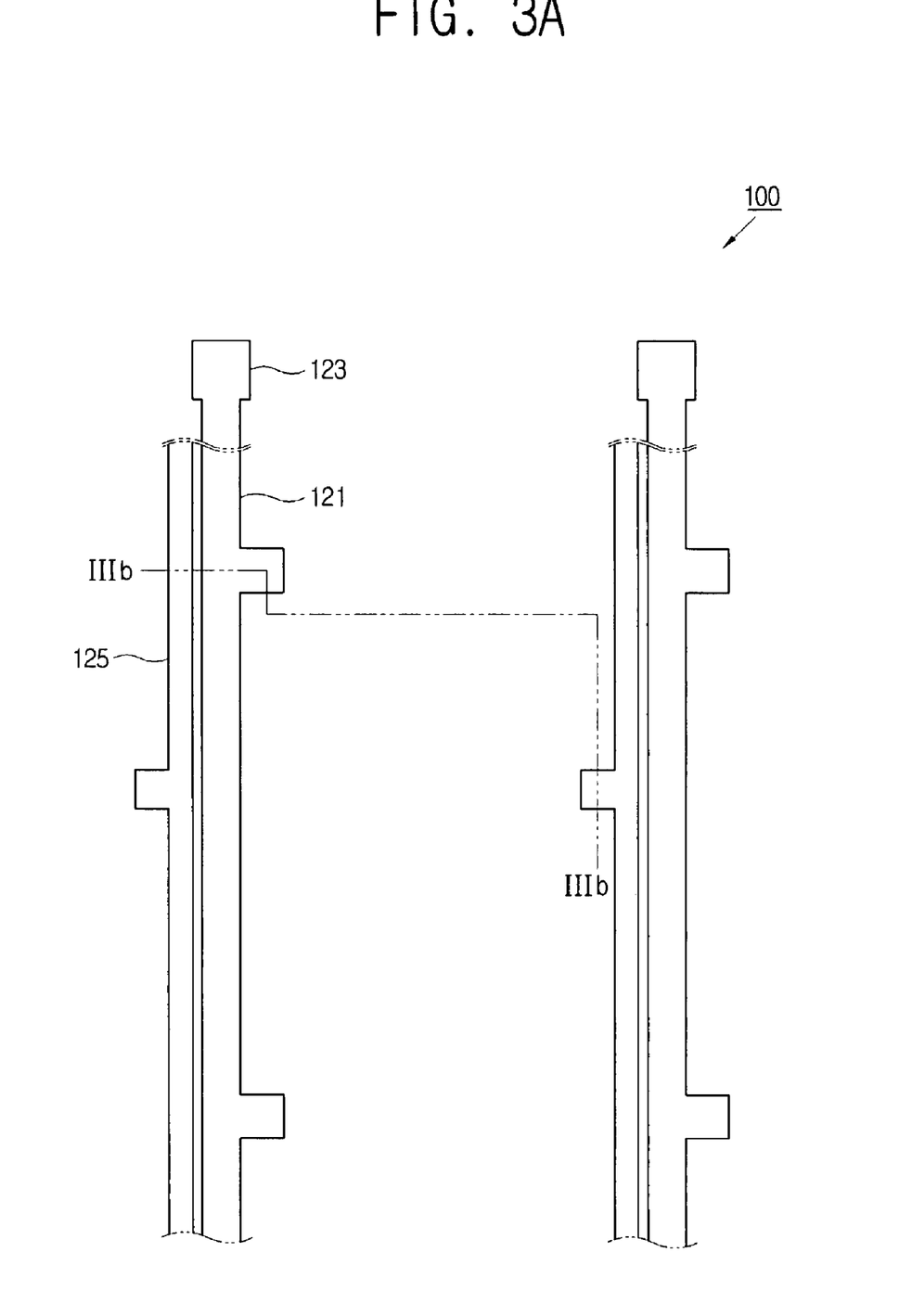
Figure 3B:
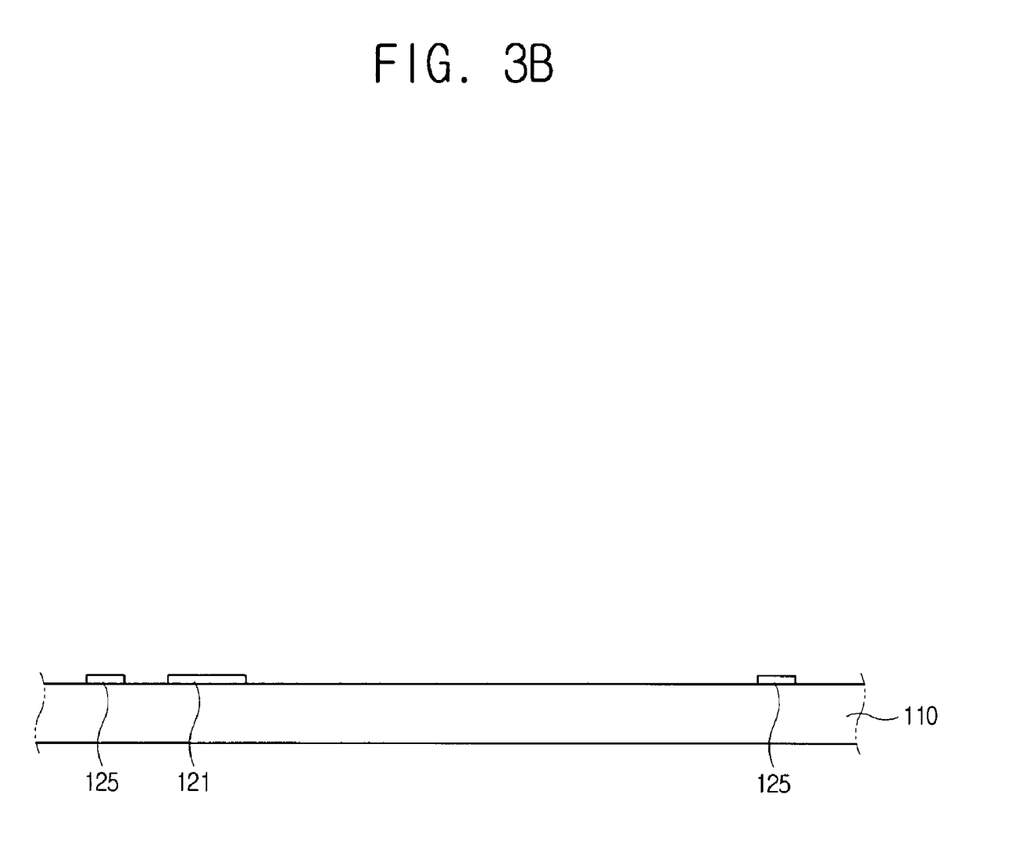

As shown in FIGS. 3a and 3b, the insulating substrate 110 comprising an insulating material such as glass, quartz, ceramic, plastic or the like is prepared. It is preferable but not essential that a plastic substrate is used as the insulating substrate 110 in manufacturing a flexible display device. Thereafter, the first wiring layers 121, 123 and 125 are simultaneously formed by depositing first wiring material on the insulating substrate 110 using a sputtering process or the like and then performing a photolithography process upon the deposited first wiring material. The first wiring layers 121, 123 and 125 comprise the data line 121 extending in one direction, the data pad 123 provided at the end of the data line 121 and the storage line 125 which is isolated from the data line 121 and formed along the data line 121.

Figure 4A:
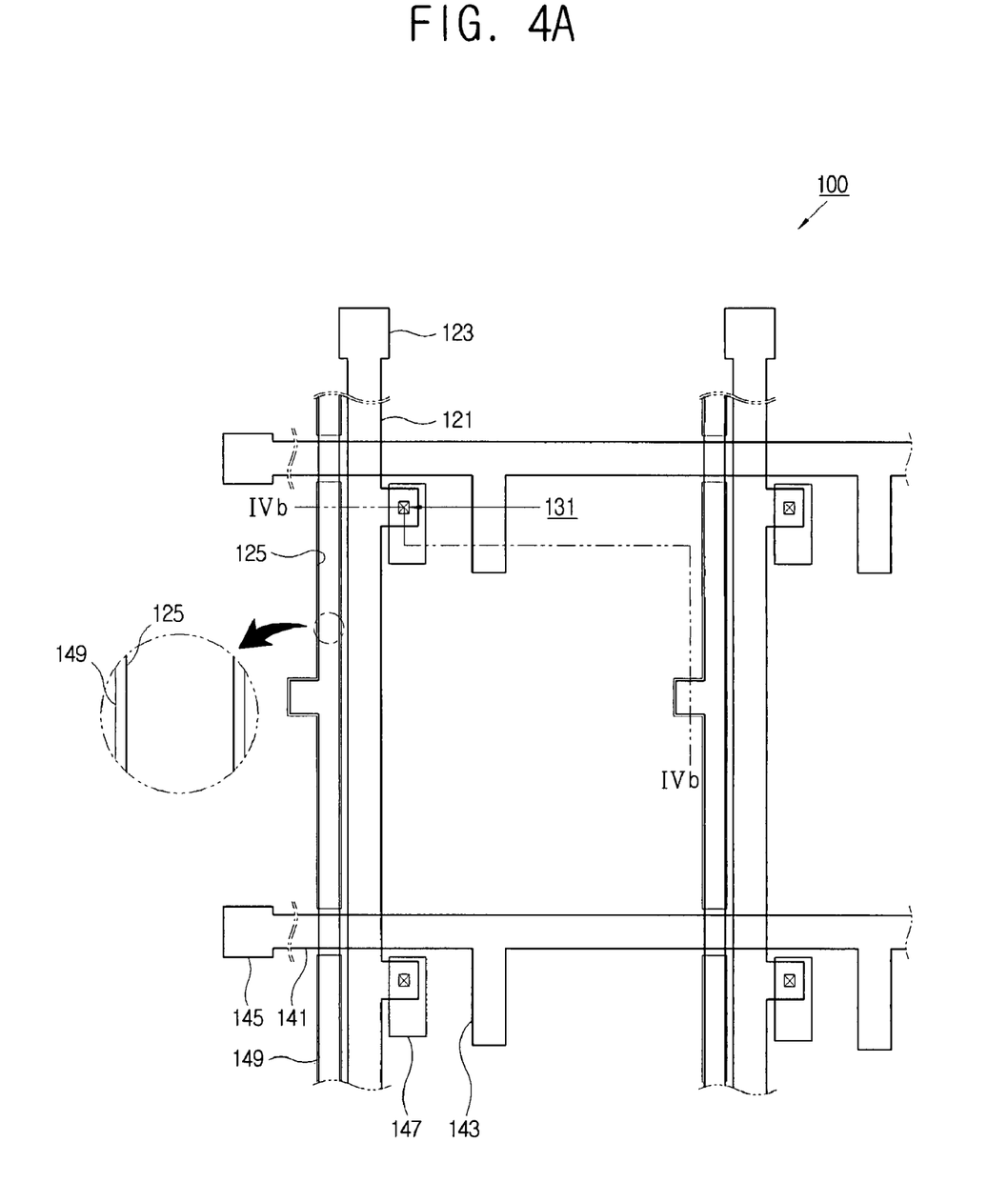
Figure 4B:
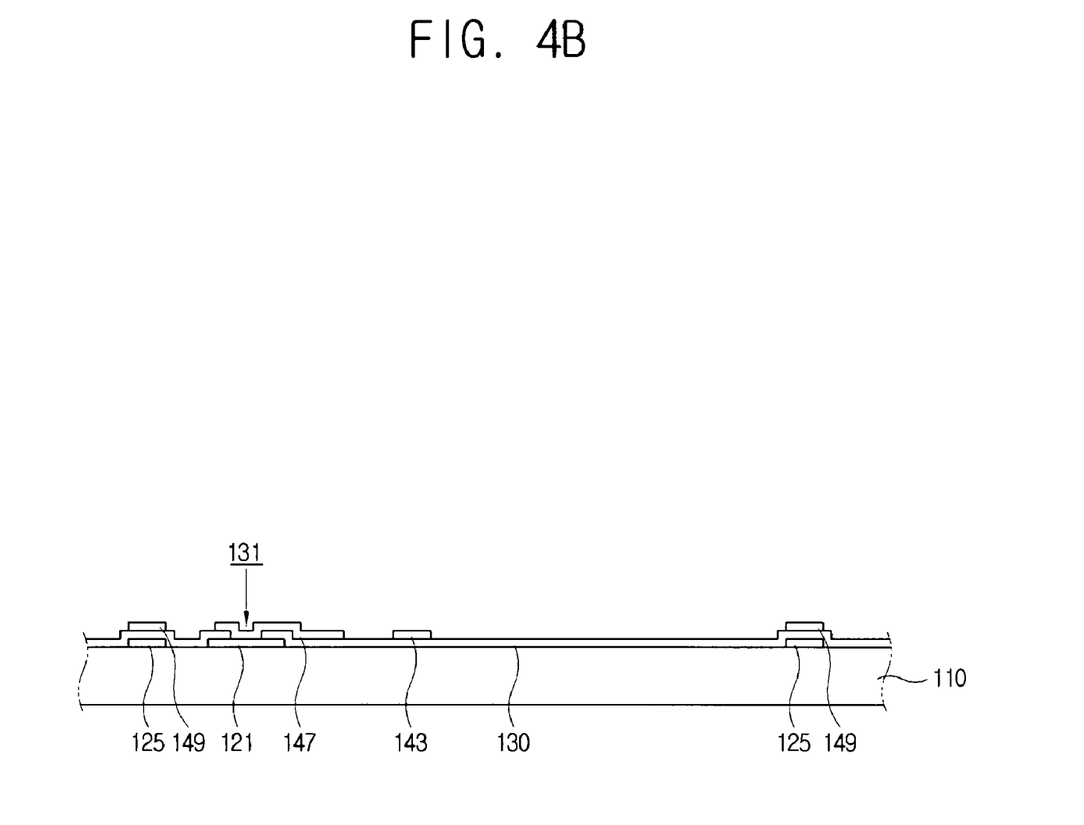

Thereafter, as shown in FIGS. 4a and 4b, a first inorganic insulating material such as silicon nitride (SiNx) or silicon oxide (SiOx) is applied on the insulating substrate 110, the first wiring layers 121, 123 and 125 to thereby form the first insulating film 130. Also, the first insulating contact hole 131 exposing the data line 121 is formed. Subsequently, the gate line 141, the gate electrode 143, the gate pad 145, the connecting member 147 and the storage capacity forming layer 149 are formed by depositing a second wiring material on the first insulating film 130 using a sputtering process or the like and then performing a photolithography process for the deposited second wiring material. In FIG. 1, the storage capacity forming layer 149 is shown to have an area larger than the storage line 125 for convenience and clarity of description. It is to be understood that the storage capacity forming layer 149 is provided to have a size corresponding to the storage line 125, or a size somewhat larger or smaller than the storage line 125, if necessary.

The formed storage line 125, first insulating film 130 and storage capacity forming layer 149 provide the storage capacity. In particular, with the structure according to the first embodiment of the present invention, the second insulating film 150 causing a voltage leakage does not provide the storage capacity, thereby minimizing the voltage leakage.

Figure 5A:
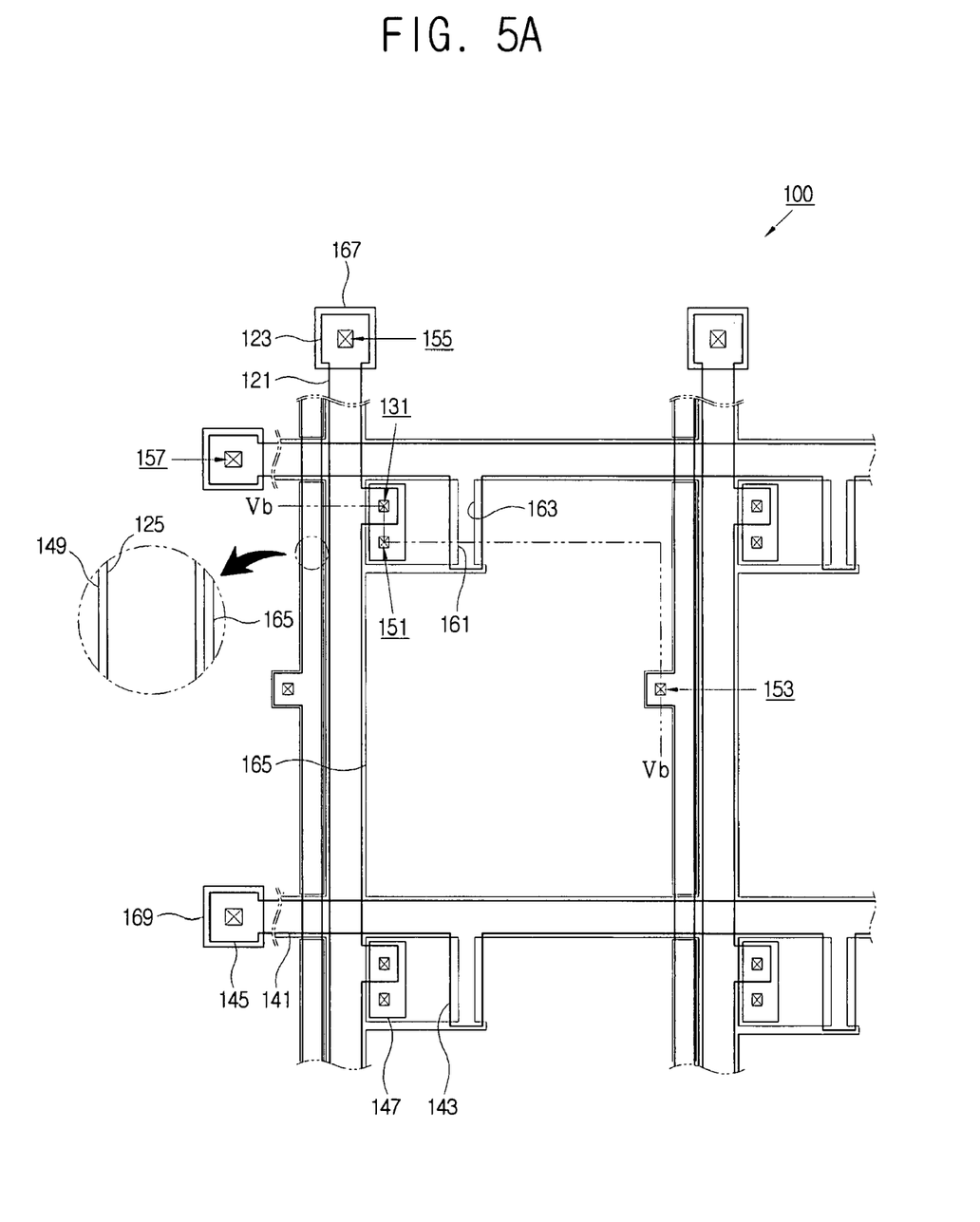
Figure 5B:
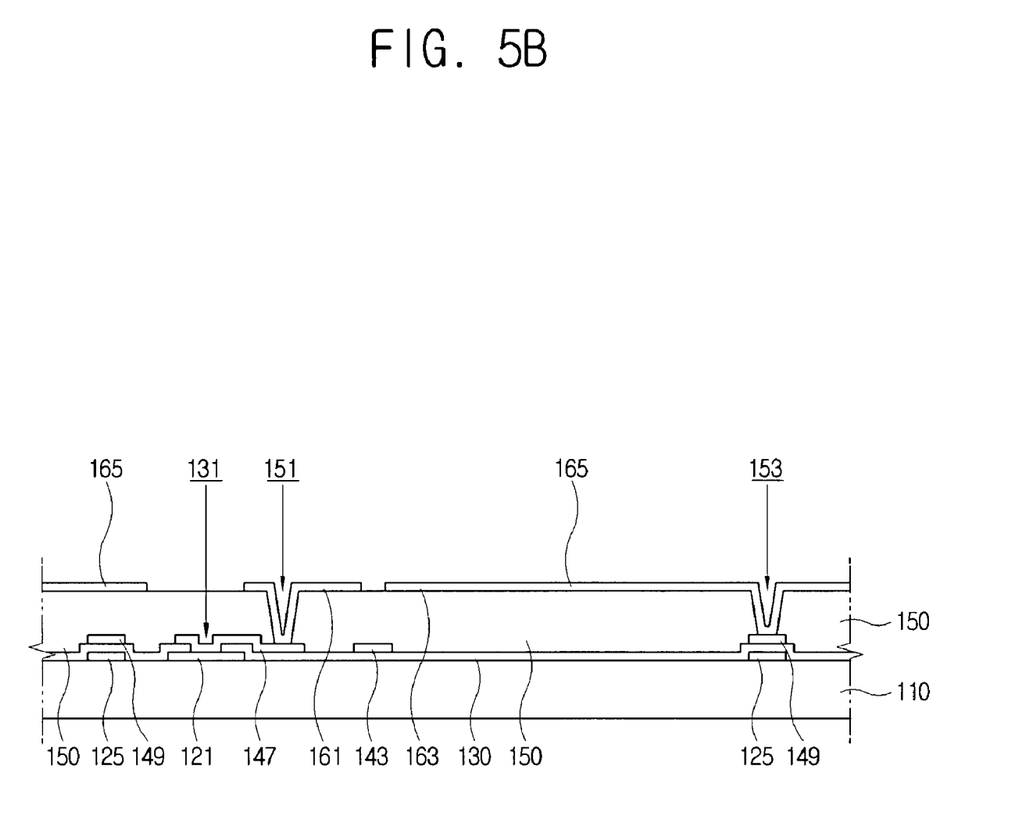

Next, as shown in FIGS. 5a and 5b, the second insulating film 150, which is a thick organic film, is formed on the second wiring layers 141, 143, 145, 147 and 149 and the first insulating film 130. The second insulating film 150 may be formed by a slit coating process, a spin coating process or the like. Subsequently, the connecting member contact hole 151, the pixel contact hole 153, the data pad contact hole 155 and the gate pad contact hole 157 are formed through an etching process. The pixel contact hole 153 connects the storage capacity forming layer 149 to the pixel electrode 165. The formed storage capacity applies a constant voltage to the liquid crystal layer via the pixel electrode 165. Subsequently, the transparent electrode layers 161, 163, 165, 167 and 169 are formed by forming transparent conductive metal oxide (transparent conductive material) such as ITO or IZO on the second insulating film 150 using a sputtering process and then performing a photolithography or etching process for the formed transparent conductive metal oxide.

The transparent electrode layers 161, 163, 165, 167 and 169 comprise the source electrode 161 connected to the data line 121 via the connecting member contact hole 151 and at least partially contacting with the organic semiconductor layer 170, the drain electrode 163 separated from the source electrode 161 by the organic semiconductor layer 170 interposed there between and defining the channel region, the pixel electrode 165 connected to the drain electrode 163 and filling the pixel region, the data pad contacting member 167 and the gate pad contacting member 169. In this case, the pixel electrode 165 is connected to the storage capacity forming layer 149 via the pixel contact hole 153.

Figure 6A:
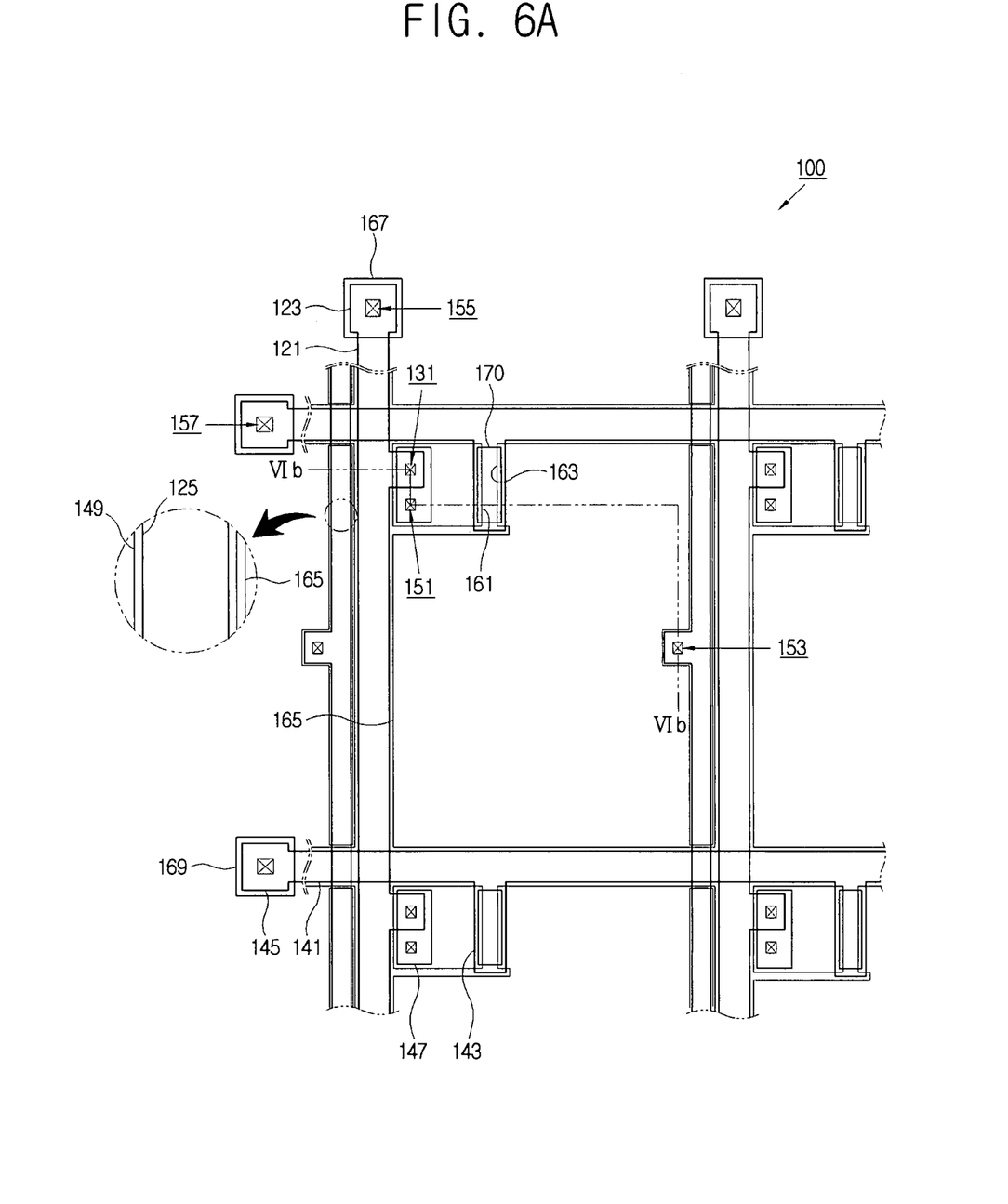
Figure 6B:
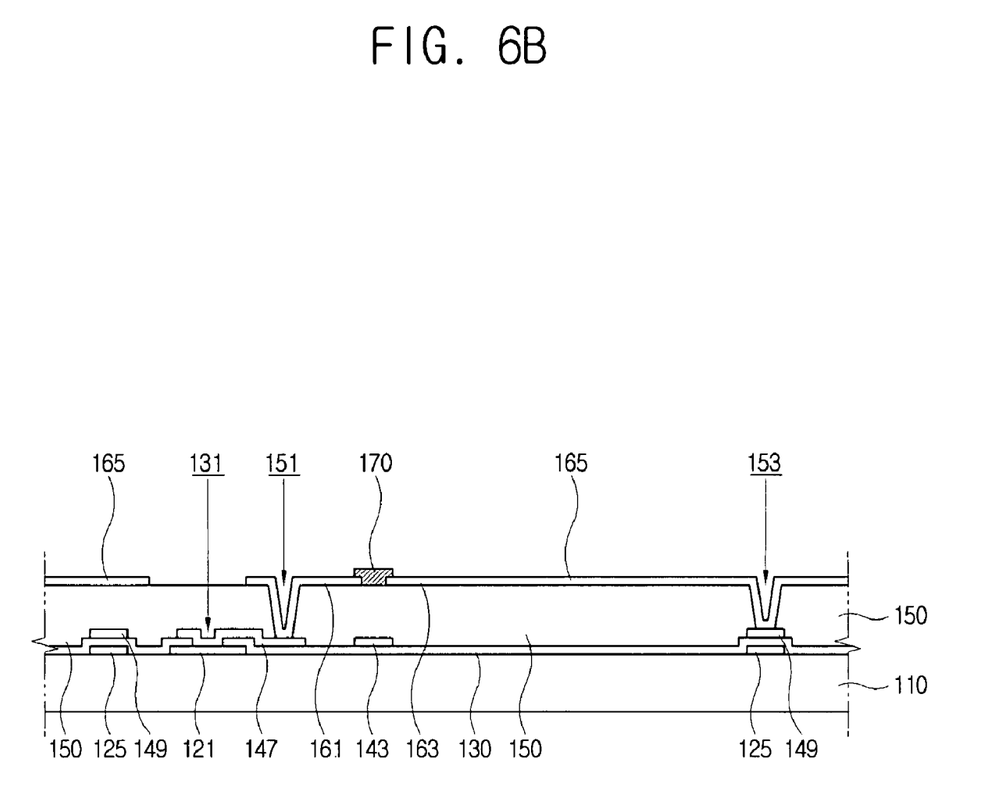

Thereafter, as shown in FIGS. 6a and 6b, the organic semiconductor layer 170 is formed by applying an organic semiconductor solution to the channel region. The organic semiconductor layer 170 may be formed by an evaporation process or a coating process. As an alternative, the organic semiconductor layer 170 may be formed by an inkjet method using partitions.

Next, the first passivation layer 181 comprising fluorine polymer is formed on the organic semiconductor layer 170 by a spin coating process or a slit coating process. Subsequently, the second passivation layer 182 comprising at least one of ITO and IZO is formed on the first passivation layer 181 by a sputtering process. Next, the second protective layer 182 is patterned to correspond to the channel region using a photolithography process. Then, the organic semiconductor layer 170 and the first passivation layer 180 are simultaneously patterned by an etching process using the patterned second passivation layer 182 as a mask. Next, the low temperature organic film 190 covering the connecting member contact hole 151 and the organic semiconductor layer 170 is further formed to complete the organic TFT as shown in FIG. 2.

Hereinafter, a display device and a manufacturing method according to second embodiment of the present invention will be described with reference to FIG. 7. In the following description about the second embodiment, only characteristic portions distinguished from the first embodiment will be described, and the omitted or summarized portions conform to the first embodiment or techniques known in the arts.

Figure 7:
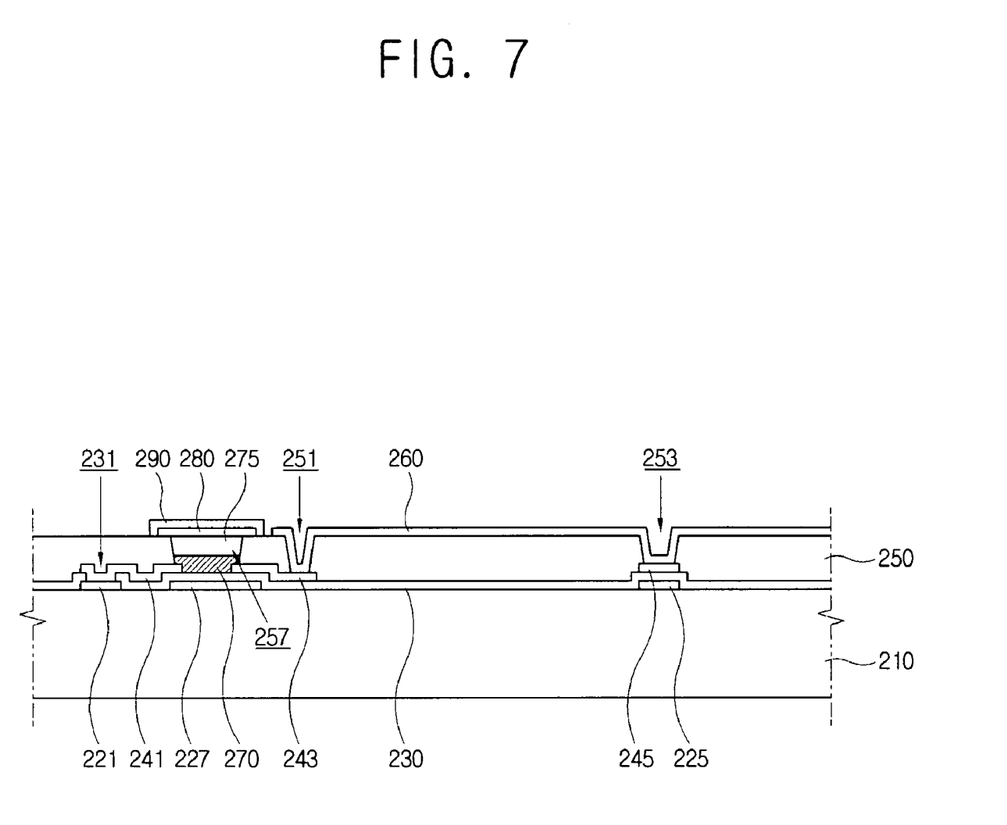
FIG. 7 is a sectional view of a TFT substrate of a display device according to a second embodiment of the present invention.

FIG. 7 is a sectional view of a TFT substrate of a display device according to the second embodiment of the present invention, showing an organic TFT having a top gate structure unlike the first embodiment.

In the second embodiment, first wiring layers 221,225 and 227 comprise a data line 221 extending in one direction, a data pad (not shown) provided at an end of the data line 221, a storage line 225 which is isolated from and parallel to the data line 221 and a light shielding film 227 located at one side of the data line 221 corresponding to an organic semiconductor layer 270. That is, unlike the first embodiment, the light shielding film 227 for shielding light from the organic semiconductor layer 270 is further provided.

In addition, second wiring layers 241, 243 and 245 comprise a source electrode 241, a drain electrode 243 and a storage capacity forming layer 245, unlike the first embodiment. The source electrode 241 includes one end connected to the data line 221 via a first insulating film contact hole 231 formed in a first insulating film 230 and the other end extending over the light shielding film 227. The drain electrode 243 is separated from the source electrode 241 by the light shielding film 227 interposed there between, defines a channel region and is connected to a pixel electrode 260. The storage capacity forming layer 245 is formed on the first insulating film 230 on the storage line 225. Accordingly, the storage line 225, the first insulating film 230 and the storage capacity forming layer 245 form liquid crystal capacity. In this case, the source electrode 241, the drain electrode 243 and the storage capacity forming layer 245 are simultaneously formed with the same material and on the same layer.

A second insulating film 250 comprising an organic material is formed on the second wiring layers 241, 243 and 245. In the second insulating film 250 are formed an opening 257 exposing a channel region, a drain contact hole 251 exposing the portion of the drain electrode 243, and a pixel contact hole 253 exposing a portion of the storage capacity forming layer 245. The opening 257, the drain contact hole 251 and the pixel contact hole 253 are simultaneously formed.

The pixel electrode 260 is formed on the second insulating film 250. The pixel electrode 260 is connected to the drain electrode 243 via the drain contact hole 251 and the storage capacity forming layer 245 via the pixel contact hole 253.

The organic semiconductor layer 270 and an organic insulating film 275 are laminated in the opening 257 in order. A gate electrode 280 is formed on the organic insulating film 275 that electrically isolates the organic semiconductor layer 270 from the gate electrode 280 and protects the organic semiconductor layer 270. A passivation layer 290 for protecting the gate electrode 280 is formed on the gate electrode 280.

With the above structure, the second insulating film 250 causing a voltage leakage does not provide the storage capacity, thereby minimizing leakage of a voltage applied to the storage line 225.

Although a few embodiments of the present invention have been shown and described, it will be appreciated by those skilled in the art that changes may be made in these embodiments without departing from the principles and spirit of the invention, the scope of which is defined in the appended claims and their equivalents.

What is claimed is:

1. A display device comprising:
    an insulating substrate;
    a first wiring layer formed on the insulating substrate, the first wiring layer including a data line and a storage line, the storage line being isolated from the data line;
    a first insulating film covering the first wiring layer;
    a second wiring layer formed on the first insulating film which includes a storage capacity forming layer formed on the storage line;
    a second insulating film covering the second wiring layer and having a pixel contact hole exposing a portion of the storage capacity forming layer; and
    a pixel electrode formed on the second insulating film and connected to the storage capacity forming layer via the pixel contact hole.

2. The display device according to claim 1, wherein the storage line, the first insulating film and the storage capacity forming layer form a storage capacity.

3. The display device according to claim 2, wherein the first wiring layer further comprises a data pad located at an end of the data line, and wherein the second wiring layer further comprises a gate wiring line including a gate line intersecting the data line, a gate electrode branched from the gate line, a gate pad provided at an end of the gate line, and connecting member located between the data line and the gate electrode and connected to the data line via a first insulating contact hole formed on the first insulating film.

4. The display device according to claim 3, wherein the first insulating film comprises an inorganic material and the second insulating film comprises an organic material, and wherein
    a plurality of contact holes are formed in the second insulating film, including a connecting member contact hole exposing a portion of the connecting member, a gate pad contact hole exposing a portion of the gate pad, and a data pad contact hole exposing a portion of the data pad.

5. The display device according to claim 4, further comprising a source electrode connected to the connecting member via the connecting member contact hole, and a drain electrode isolated from the source electrode and connected to the pixel electrode,
    wherein,
        the gate electrode is interposed between the drain electrode and the source electrode, a channel region being defined between the source and drain electrodes;
        each of the source electrode, the drain electrode and the pixel electrode containing one of ITO (Indium Tin Oxide) and IZO (Indium Zinc Oxide); and
        the source electrode and the drain electrode are provided on the second insulating film.

6. The display device according to claim 5, wherein an organic semiconductor layer is formed in the channel region.

7. The display device according to claim 2, wherein the first wiring layer further comprises a data pad located at an end of the data line, and a light shielding film located at one side of the data line, and
    the second wiring layer further comprises a source electrode and a drain electrode separated from each other on the second insulating film by the light shielding film interposed between the source electrode and the drain electrode, and defining a channel region.

8. The display device according to claim 7, wherein the source electrode the drain electrode and the storage capacity forming layer are formed on the same layer.

9. The display device according to claim 8, wherein an opening exposing the channel region and a drain contact hole exposing a portion of the drain electrode are formed in the second insulating film, and
    the pixel electrode is connected to the drain electrode via the drain contact hole.

10. The display device according to claim 8, wherein a first insulating contact hole exposing a portion of the data line is formed in the first insulating film, and the source electrode is connected to the data line via the first insulating contact hole.

11. The display device according to claim 9, further comprising:
an organic semiconductor layer formed in the opening;
an organic insulating film covers the organic semiconductor layer; and
a gate wiring line including a gate electrode formed on the organic insulating film on the organic semiconductor layer.

12. A method of manufacturing a display device, comprising:
forming a first wiring layer, the first wiring layer comprising a data line and a storage line;
forming a first insulating film to cover the first wiring layer;
forming a second wiring layer on the first insulating layer, the second wiring layer comprising a storage capacity forming layer;
forming a second insulating film on the second wiring layer with a pixel contact hole exposing a portion of the storage capacity forming layer; and
forming a pixel electrode on the second insulating film, the pixel electrode contacting with the storage capacity forming layer via the pixel contact hole.

13. The manufacturing method according to claim 12, wherein
the first wiring layer further comprises a data pad located at an end of the data line, and
the second wiring layer further comprises a gate wiring line including a gate line intersecting the data line, a gate electrode branched from the gate line, a gate pad provided at an end of the gate line, and a connecting member connected to the data line via a first insulating contact hole formed on the first insulating film.

14. The manufacturing method according to claim 13, wherein
the second insulating film further comprises a connecting member contact hole exposing a portion of the connecting member, a gate pad contact hole exposing a portion of the gate pad and a data pad contact hole exposing a portion of the data pad, and
the pixel contact hole, the connecting member contact hole, the gate pad contact hole and the data pad contact hole are simultaneously formed.

15. The manufacturing method according to claim 13, wherein
a source electrode is connected to the connecting member via the connecting member contact hole,
a drain electrode separated from the source electrode by a channel region are further provided on the second insulating film,
the pixel electrode is connected to the drain electrode, and
the source electrode, the drain electrode and the pixel electrode are simultaneously formed.

16. The manufacturing method according to claim 15, wherein each of the source electrode, the drain electrode and the pixel electrode comprises one of ITO (Indium Tin Oxide) and IZO (Indium Zinc Oxide).

17. The manufacturing method according to claim 13, further comprising:
forming an organic semiconductor layer in the channel region.

18. The manufacturing method according to claim 12, wherein
the first wiring layer further comprises a data pad located at an end of the data line, and a light shielding film located at one side of the data line, and
the second wiring layer further comprises a source electrode and a drain electrode isolated from each other by the light shielding film interposed between the source electrode and the drain electrode and defining a channel region, and
the source electrode, the drain electrode and the storage capacity forming layer are simultaneously formed.

19. The manufacturing method according to claim 18, further comprising:
forming an organic semiconductor layer in the channel region;
forming an organic insulating film on the organic semiconductor layer; and
forming a gate wiring line including a gate electrode located on the organic insulating film.

20. The manufacturing method according to claim 19, wherein
an opening exposing the channel region, a drain contact hole exposing a portion of the drain electrode, a gate pad contact hole exposing a portion of the gate pad and a data pad contact hole exposing a portion of the data pad are formed in the second insulating film,
the pixel electrode is connected to the drain electrode via the drain contact hole, and
the pixel contact hole, the opening, the drain contact hole, the gate pad contact hole and the data pad contact hole are simultaneously formed.

21. The manufacturing method according to claim 19, wherein
a first insulating contact hole exposing a portion of the data line is formed in the first insulating film, and
the source electrode is connected to the data line via the first insulating contact hole.

* * * * *